Nov. 16, 1926. Re. 16,475

S. S. BAER

RAZOR BLADE SHARPENER

Original Filed Dec. 18, 1924

Inventor,

S. S. Baer.

By- Sterling P. Buck,

Attorney.

Reissued Nov. 16, 1926. Re. 16,475

UNITED STATES PATENT OFFICE.

SAMUEL S. BAER, OF BALTIMORE, MARYLAND.

RAZOR-BLADE SHARPENER.

Original No. 1,569,213, dated January 12, 1926, Serial No. 756,840, filed December 18, 1924. Application for reissue filed July 17, 1926. Serial No. 123,227.

This invention relates to edge-tool sharpeners, and especially to a very simple and practical razor-blade sharpener.

One object of this invention is to provide a device of this character that has maximum convenience in applying the razor-blade in the sharpening position.

Another object is to provide a device of this character having no gears and no handle, and requiring no fixed place of attaching it for operation.

Another object is to provide a device of this character that is composed of few and very simple parts in a compact combination, such parts being quickly disassembled and reassembled for the purpose of cleaning and interchanging the sharpening elements.

Another object is to provide a device of this character that is operable by one hand of a person holding the razor-blade and using the latter as an actuating element for moving the sharpening elements and also for moving the edge of the blade from one to the other of the sharpening elements.

Another object is to provide a device of this character in which the sharpening elements are housed against the action of atmospheric conditions and against the accumulation of dust thereon.

Figure 1:
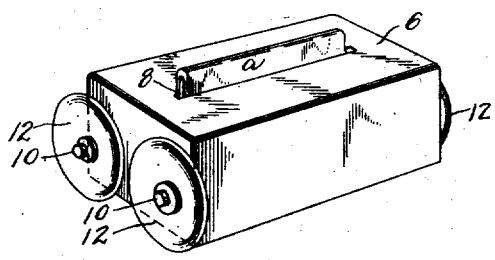
Figure 2:
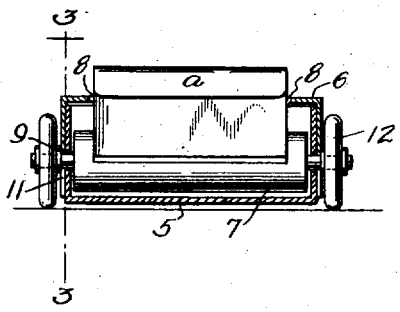
Figure 3:
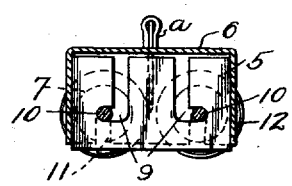

Other objects and important features are pointed out or implied in the following details of description, in connection with the accompanying drawings in which:

Fig. 1 is a perspective view of the complete tool-sharpening device, in the form of a razor-blade sharpener. Fig. 2 is a longitudinal sectional view. Fig. 3 is a sectional view along the line 3—3 of Figure 2.

Figure 4:
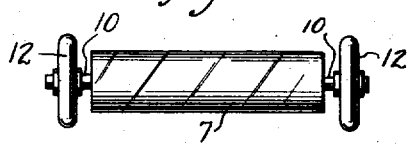

Fig. 4 is a detail view of one of the sharpening rollers detached from the balance of the device.

Referring to these drawings in detail, in which similar reference characters correspond to similar parts throughout the several views, a casing 5 and its cover 6 constitute a closed box or housing in which two rollers or sharpening elements 7 are enclosed and thus protected from weather conditions and the accumulation of dust thereon. Each roller 7 may be made of any appropriate material for abrading or polishing the edges of the razor-blades which are inserted (one at a time) in a slot 8 which is only wide enough to permit the respective razor blades to be inserted and properly tilted therein, so the relatively thick backs or holders of the razor-blades will not pass into this slot, but the same rests on the margins of the slot and prevents the edge of the razor-blade from extending below the proper level to engage the sharpening rollers at the proper angle or tangent for best results in sharpening the blade. In this connection, it should be understood that the razor-blades are tilted from the vertical position for bringing the edges against the sharpening elements or rollers, as will presently appear.

The casing 5 is provided with two pairs of angular slots 9 of which the lower and laterally or horizontally extending ends form bearings for the axles 10 of the sharpening rollers. The cover 6 is formed with two pairs of slots 11 which open through the lower edge of the cover and receive said axles in the relation for holding them in the bearings when the cover is on the casing; but by removing the cover, the axles are released so that the rollers can be easily and quickly removed and replaced or interchanged.

Each roller is provided with two traction wheels 12, on the axles at its opposite ends, these wheels being of a considerably larger diameter than the sharpening part of the roller. The journal portion of each axle 10 is between the adjacent traction roller and the sharpening roller, so that the latter is spaced above the bottom of the casing, while the traction rollers are outside of the casing and extend below the lower surface of the casing. Each traction roller is preferably provided with treads of rubber or material that will not deface a table or other furniture on which they may be rolled in operating the device.

In operation, the razor-blade is first inserted in the slot 8, and its thickened portion or holding member *a* rests on the edges of the slot, while the thinner main part of the blade extends between the rollers 7. Now, by bearing lightly, with the hand, on the razor-blade's holding member or handle, while pushing the hand forward, this tilts the razor-blade and causes the cutting edge thereof to bear against the rear roller 7, and a continued forward movement of the hand causes the entire device to roll forward on its traction wheels, thereby rotating the sharpening rollers, so the rear sharpening roller is abrading and sharpening the cutting edge. Next, by reversing the movement of the hand from forward to rearward, this tilts the razor blade in the opposite direction so its cutting edge bears against the other sharpening roller while the entire device rolls rearward, so the cutting edge is now being sharpened by such other sharpening roller. By a few such forward and rearward movements, the sharpening operation may be completed. In the foregoing, it is assumed that the front of the device is that part corresponding to the front of the hand of the operator, while the rear part corresponds to the rear or wrist-joint of the hand.

This invention is susceptible of numerous changes within the scope of the claims:

What I claim as my invention is:

1. In a sharpening device, the combination of a sharpening roller provided with journals and with traction rollers, and a box having bearings for said journals, the sharpening surface of said sharpening roller being enclosed within said box, the traction rollers extending below the bottom of said box and adapted to roll on a table or other plane surface and thereby impart rotary movements to said sharpening roller, the top of the box being formed with a slot within which part of a blade may be inserted and tilted on the edge of the slot in one direction into contact with the sharpening surface while the remainder is grasped and used to propel the device in an opposite direction over a surface.

2. In a sharpening device, the combination of two spaced sharpening rollers each provided with journals and with traction rollers, and a box having bearings for said journals, the sharpening surface of each sharpening roller being enclosed within said box, the traction rollers extending below the bottom of the box, the top of the box having a slot within which the blade may be inserted and tilted on the edges of the slot alternately in opposite directions into contact with the sharpening surfaces of the sharpening rollers while the remainder of the blade is grasped and used to propel the device in opposite directions over a surface and for effecting the tilting of the blade on said edges of the slot.

3. In a sharpening device the combination of a sharpening roller provided with journals and traction rollers, and a body having bearings for said journals and having in its top part a slot within which a part of the blade can be inserted and tilted on the edge of the slot in one direction into contact with the sharpening surface while another part of the blade is grasped and used to propel the device, in the opposite direction from that in which the edge is tilted, on a surface on which the traction rollers operate to turn said sharpening roller.

4. In a sharpening device; the combination of two sharpening rollers provided with journals and traction rollers; and a body having bearings for said journals and having its top part provided with means to suspend a blade between said sharpening rollers in such relation that the blade can be grasped and use as a handle which is operable to roll the device forward on its traction rollers and to hold the blade tilted with the rear side of its cutting edge against the rear sharpening roller, and which handle is operable to roll the device rearward and hold the blade tilted with the front side of its cutting edge against the front sharpening roller.

In testimony whereof, I affix my signature.

SAMUEL S. BAER.